United States Patent [19]
Ikka

[11] Patent Number: 5,604,052
[45] Date of Patent: Feb. 18, 1997

[54] STRUCTURE OF A BATTERY HOLDING SECTION INCLUDED IN A PORTABLE ELECTRONIC APPARATUS

[75] Inventor: Masahiro Ikka, Shizuoka, Japan

[73] Assignee: NEC Corporation, Tokyo, Japan

[21] Appl. No.: 614,208

[22] Filed: Mar. 12, 1996

[30] Foreign Application Priority Data

Mar. 15, 1995 [JP] Japan .................................. 7-054850

[51] Int. Cl.⁶ .................................................. H02M 2/10
[52] U.S. Cl. ............................................. 429/100; 429/96
[58] Field of Search ................................ 429/100, 96, 97, 429/98, 99

[56] References Cited

U.S. PATENT DOCUMENTS 4,487,820  12/1984  Engelstein et al. ................... 429/100
4,653,822   3/1987  Kanazawa et al. .................... 339/17 E
4,828,944   5/1989  Yabe et al. .............................. 429/97
5,240,792   8/1993  Kawabata et al. ..................... 429/197

*Primary Examiner*—Stephen Kalafut
*Assistant Examiner*—Richard H. Lilley, Jr.
*Attorney, Agent, or Firm*—Young & Thompson

[57] ABSTRACT

In a portable electronic apparatus, the positive and negative electrodes of a battery and a first and a second terminals included in a battery holding section sequentially contact each other, thereby feeding power to electronic circuitry built in the apparatus. This successfully stabilizes the circuitry. After the battery has been fully received in the battery holding section, the negative electrode of the battery contacts a third terminal provided in the battery holding section. As a result, a voltage signal is fed from the third terminal to the circuitry, so that the circuitry is free from malfunctions.

6 Claims, 4 Drawing Sheets

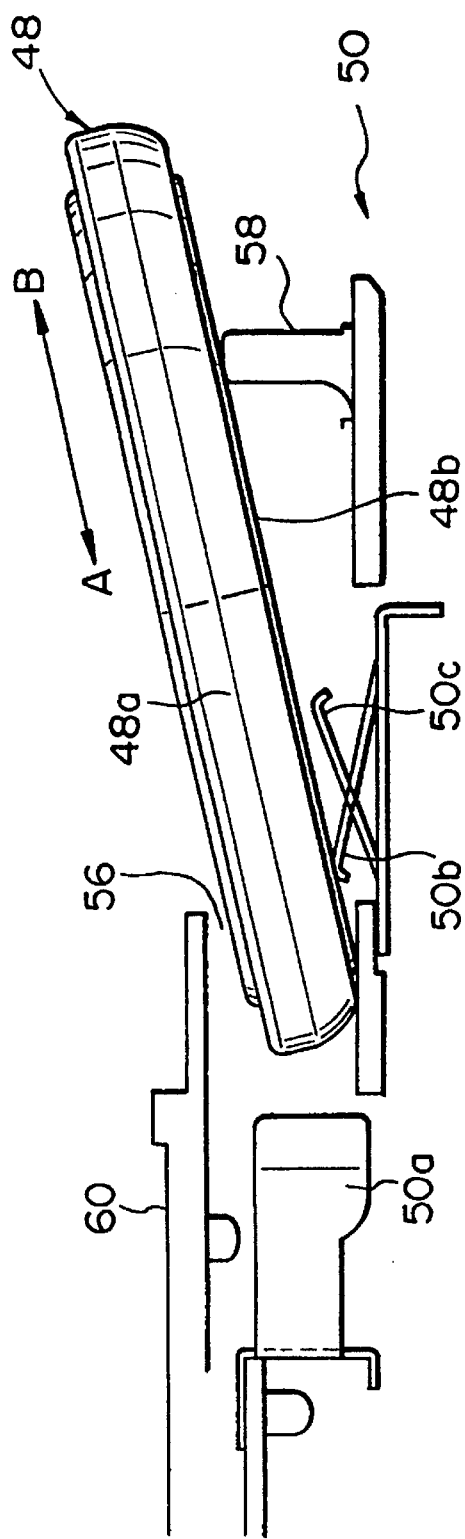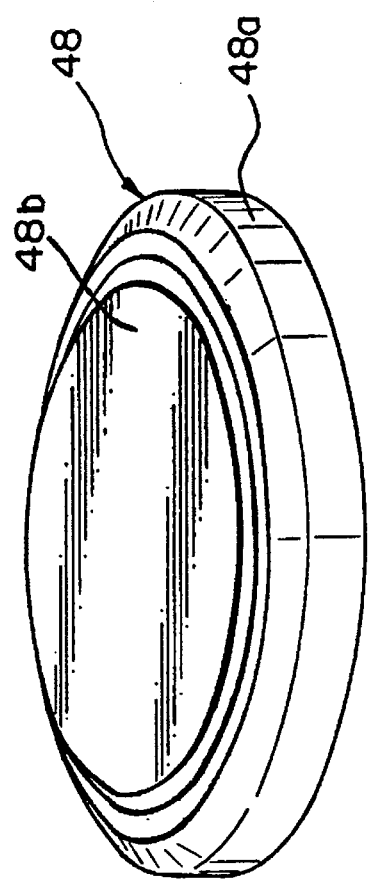

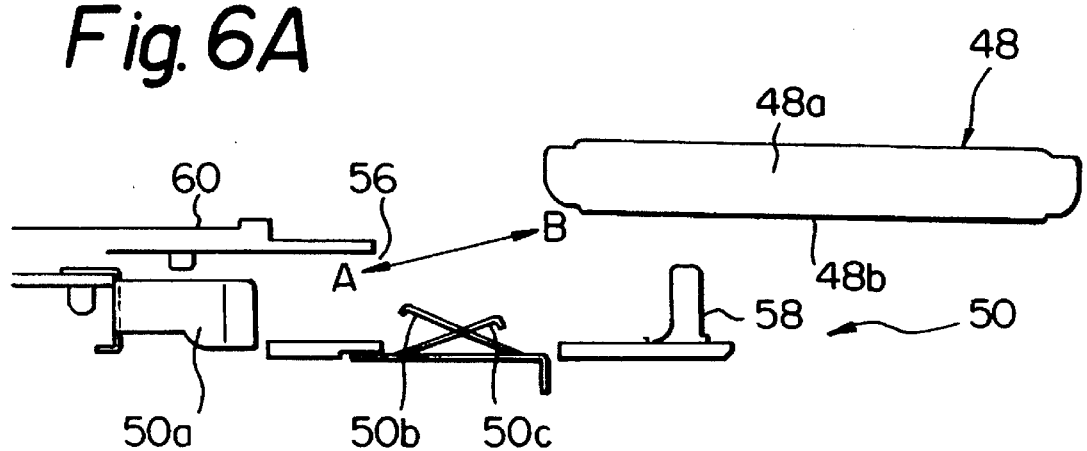
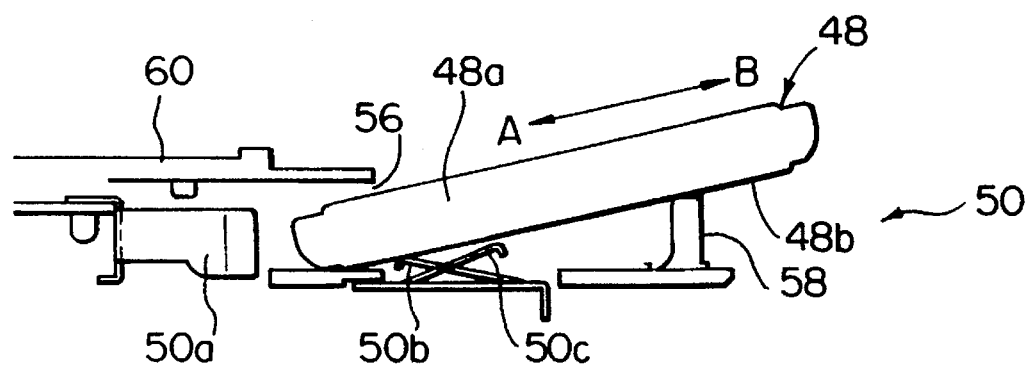
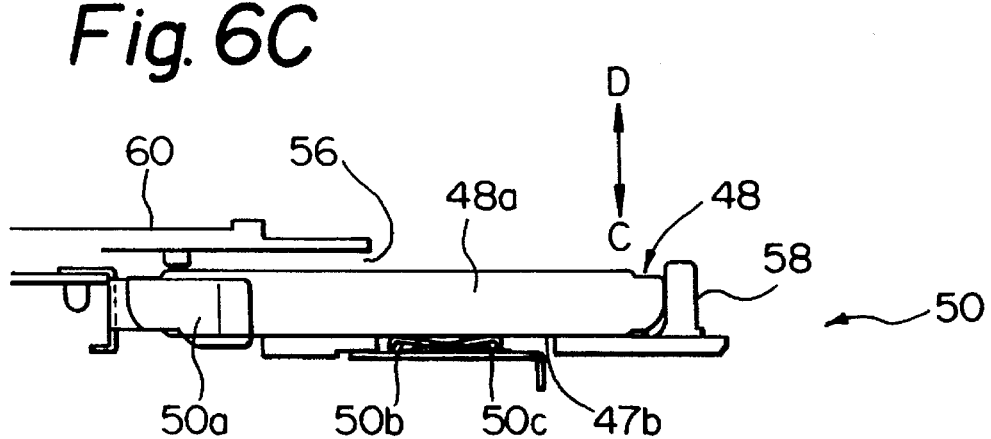

STRUCTURE OF A BATTERY HOLDING SECTION INCLUDED IN A PORTABLE ELECTRONIC APPARATUS

BACKGROUND OF THE INVENTION

The present invention relates to an electronic apparatus and, more particularly, to the structure of a battery holding section included in the apparatus for removably holding a miniature battery for powering the apparatus.

Various kinds of portable electronic apparatuses including portable telephones, radio pagers and handy terminals are extensively used today. Such an apparatus is powered by a miniature battery and has a battery holding section in its casing. Japanese Patent Laid-Open Publication No. 4-192268, for example, discloses a battery holding section formed in the casing of a handy terminal which interchanges data with, e.g., a personal computer or an IC (Integrated Circuit) card. This battery holding section has a pair of connection terminals implemented as resilient coils and capable of contacting the positive and negative terminals of a battery, respectively. When the battery is inserted into or removed from the holding section, the electrodes of the battery and the connection terminals of the holding section contact each other with a certain time lag. Particularly, when the battery is removed from the holding section, one of the electrodes and associated one of the connection terminals are released from each other, and then the other electrode and the other connection terminal are released from each other. This successfully obviates the chattering of the power source and thereby frees electronic circuitry built in the handy terminal from malfunctions.

However, the handy terminal described above cannot implement, e.g., an arrangement in which at the time of insertion of the battery, a voltage from one connection terminal is fed to two different lines, but fed to one line earlier than to the other line. This kind of arrangement is useful to stabilize the electronic circuitry before the voltage signal from the other line is input thereto, thereby preventing the circuitry from malfunctioning.

SUMMARY OF THE INVENTION

It is therefore an object of the present invention to provide a new structure of a battery holding section included in a portable electronic apparatus and freeing electronic circuitry built in the apparatus from malfunctions.

It is another object of the present invention to provide a portable electronic apparatus having a battery holding section configured to free electronic circuitry built in the apparatus from malfunctions.

In accordance with the present invention, a structure of a battery holding section included in a portable electronic apparatus has an opening for allowing a battery to be partly inserted into the battery holding section only in a predetermined direction. A first connection terminal contacts a first electrode of the battery when the battery is being inserted through the opening. A second connection terminal contacts a second electrode of the battery first. A third connection terminal contacts the second electrode last when the battery is fully received in a preselected position in the battery holding section.

Also, in accordance with the present invention, in a portable electronic apparatus having a battery holding section, the battery holding section has an opening for allowing a battery to be partly inserted into the battery holding section only in a predetermined direction. A first connection terminal contacts a first electrode of the battery when the battery is being inserted through the opening. A second connection terminal contacts a second electrode of the battery first. A third connection terminal contacts the second electrode last when the battery is fully received in a preselected position in the battery holding section.

Further, in accordance with the present invention, a structure of a battery holding section included in a portable telephone has an opening for allowing a battery to be partly inserted into the battery holding section only in a predetermined direction. A frame is positioned at the insertion side of the opening and has a height corresponding to the thickness of the battery. The frame allows the battery to be inserted through the opening only in its inclined position in the preselected direction. A first power feed terminal contacts a first electrode provided on the side of the battery when the battery is being inserted through the opening in the inclined position. A second power feed terminal contacts a second electrode provided on one major surface of the battery first. A third power feed terminal contacts the second electrode last when the battery is fully received in a preselected position in the battery holding section.

Moreover, in accordance with the present invention, in a portable telephone having a battery holding section, the battery holding section has an opening for allowing a battery to be partly inserted into the battery holding section only in a predetermined direction. A frame is positioned at the insertion side of the opening and has a height corresponding to the thickness of the battery. The frame allows the battery to be inserted through the opening only in its inclined position in the preselected direction. A first power feed terminal contacts a first electrode provided on the side of the battery when the battery is being inserted through the opening in the inclined position. A second power feed terminal contacts a second electrode provided on one major surface of the battery first. A third power feed terminal contacts the second electrode last when the battery is fully received in a preselected position in the battery holding section.

BRIEF DESCRIPTION OF THE DRAWINGS

The above and other objects, features and advantages of the present invention will become more apparent from the following detailed description taken with the accompanying drawings in which:

FIG. 4 is a section showing an essential part of the battery holding section of the embodiment;

FIG. 5 is an external perspective view showing a specific configuration of a battery to be received in the battery holding section; and FIGS. 6A–6C demonstrate how the battery is inserted into the battery holding section.

DESCRIPTION OF THE PREFERRED EMBODIMENT

Figure 1:
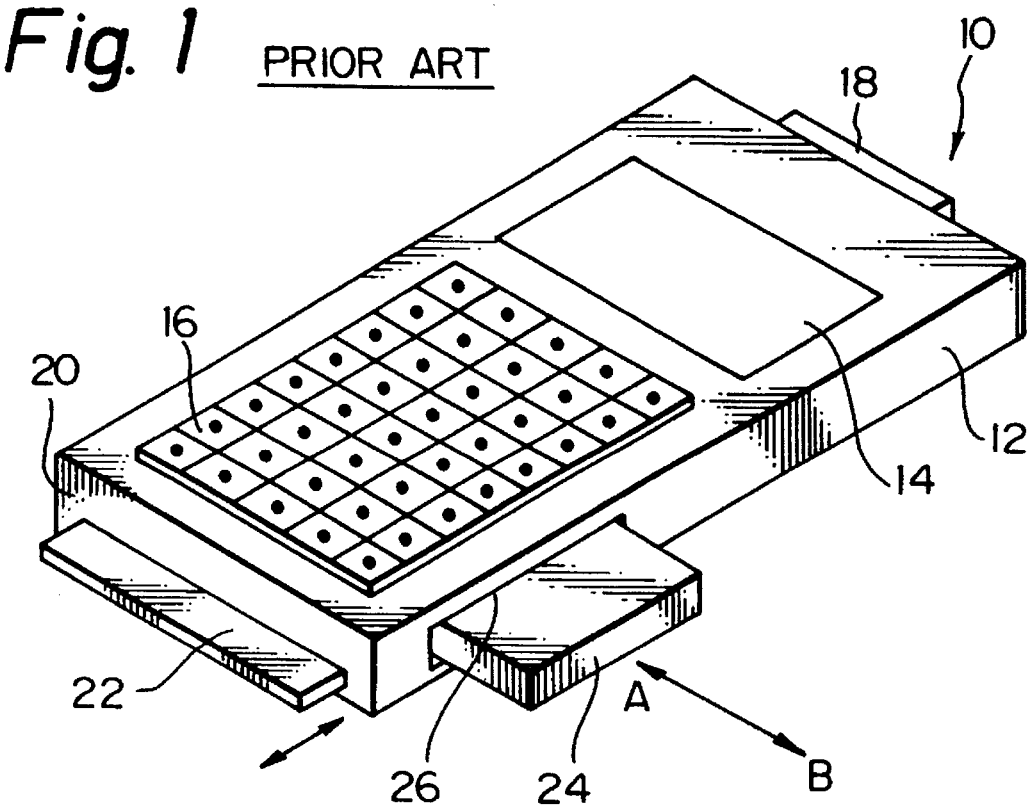
FIG. 1 is an external perspective view of a portable electronic apparatus having a conventional battery holding section.

To better understand the present invention, a brief reference will be made to the structure of a conventional battery holding section, shown in FIGS. 1 and 2. The structure to be described is included in the handy terminal of previously mentioned Japanese Patent Laid-Open Publication No. 4-192268. As shown in FIG. 1, the handy terminal, generally 10, has a substantially rectangular parallelepiped casing 12 which can be held by hand. A keyboard 16 is mounted on the upper surface of the casing 12. An LCD (Liquid Crystal Display) 14, numeral keys, function keys, a mode switching key and an enter key are arranged on the keyboard 16. A communication interface 18 is located on one side of the casing 12 and connectable to a personal computer, not shown. An auxiliary interface 20 is located on the side of the casing 12 opposite to the communication interface 18. An IC card 22 or similar data transfer medium may be inserted into the interface 20, as needed. The casing 12 has a battery holding section 26 to which a battery 24 for powering the terminal 10 is removably mounted.

Figure 2:
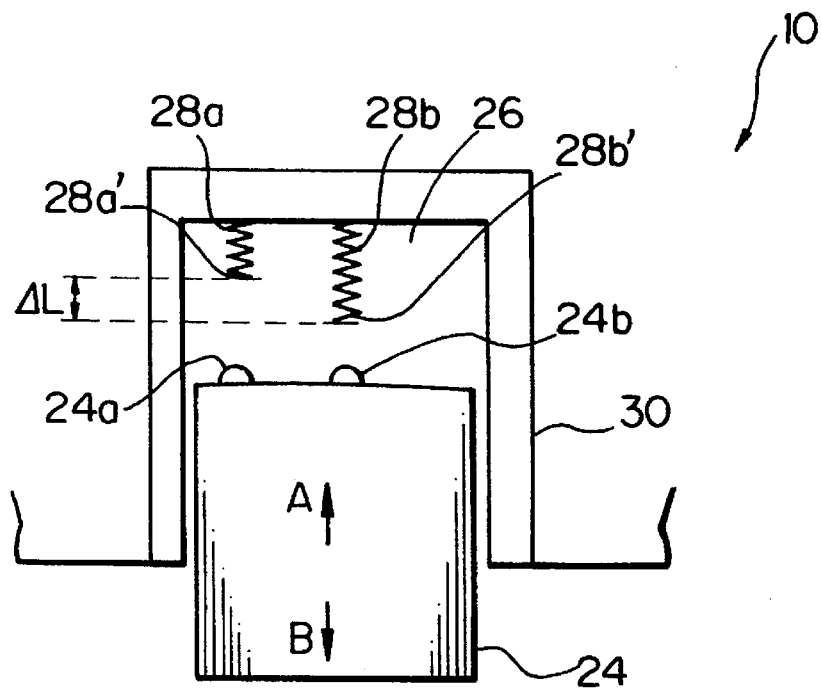
FIG. 2 is a section showing the battery holding section of FIG. 1.

As shown in FIG. 2, two connection terminals 28a and 28b are positioned in the battery holding section 26. The terminals 28a and 28b are implemented by resilient conductive coils and different in length from each other in their free state in a direction A in which the battery 24 is inserted into the holding section 26. The battery 24 has its positive electrode 24a and negative electrode 24b electrically connected to the terminals 28a and 28b, respectively, when mounted to the holding section 26. The rear ends of the terminals 28a and 28b are affixed to an insulate support frame 30 and connected to electronic circuitry built in the terminal 10. The front ends of the terminals 28a and 28b are respectively implemented as contacts 28a' and 28b' which are connectable to the electrodes 24a and 24b of the battery 24. A lock knob, not shown, is provided on the terminal 10. After the battery 24 has been mounted to the holding section 26 in the direction A, the lock knob is operated to lock the battery 24 in position. As a result, the battery 24 is prevented from slipping out in a direction B opposite to the direction A. The lock knob may be operated to unlock and remove the battery 24 in the direction B. The terminals 28a and 28b are provided with a sufficient difference ΔL in length in their free state. Hence, even when the battery 24 or the terminals 28a and 28b vibrate during the course of removal of the battery 24, the terminals 24 are prevented from contacting the electrodes 24a and 24b of the battery 24 alternately; otherwise, there would be brought about the chattering of the power source.

Specifically, when the battery 24 is removed from the holding section 26, one of the contacts 28a' and 28b' (contact 28' in FIG. 2) is released from the associated electrode (electrode 24a in FIG. 2) of the battery 24 first. Subsequently, the other contact 28b' is released from the other electrode 24b. This successfully obviates the chattering of the power source and thereby frees the internal circuitry from malfunctions. However, it is not practicable with the above terminal 10 to, e.g., feed, when the battery 24 is mounted to the holding section 26, the voltage of one of the contacts 28a' and 28b' to two different lines, but to one line earlier than the other line. This kind of arrangement is useful to stabilize the internal circuitry before the voltage signal from the other line is input to the circuitry, as discussed earlier.

Figure 3:
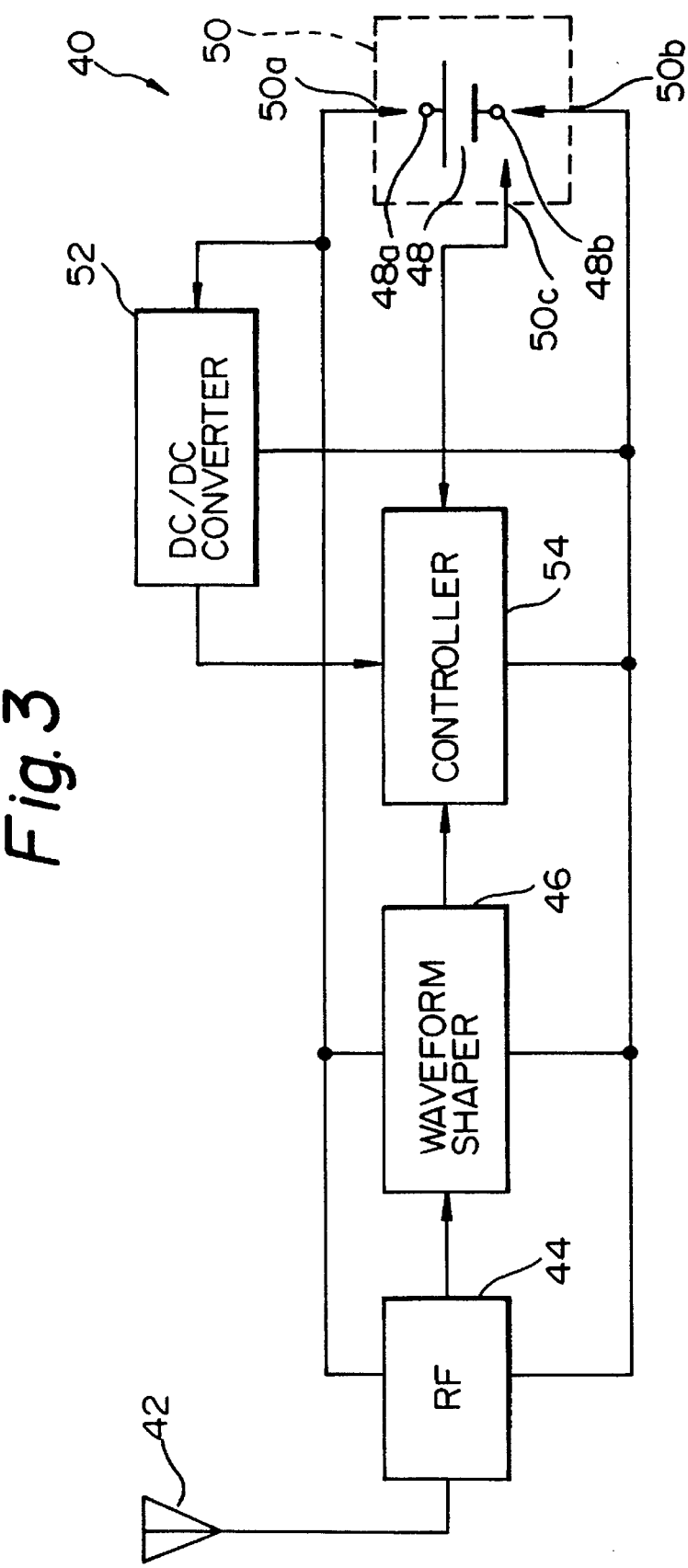
FIG. 3 is a block diagram schematically showing a portable electronic apparatus having a battery storing section embodying the present invention.

Referring to FIG. 3, a portable electronic apparatus having a battery holding section embodying the present invention is shown in a schematic block diagram. As shown, the apparatus, generally 40 has a radio frequency (RF) section 44 to which a signal coming in through an antenna 42 is applied. A waveform shaper 46 shapes the waveform of the signal received by the RF section 44. A battery holding section 50 stores a removable battery 48 having a positive electrode 48a and a negative electrode 48b. A power feed terminal 50a is provided in the battery holding section 50. A DC/DC converter 52 converts a voltage fed from the power feed terminal 50a to another voltage. The output voltage of the DC/DC converter 52 is applied to a controller 54. The negative potential of the battery 48 is also applied to the controller 54 via another power feed terminal 50b of the battery holding section 50. Further, a negative potential is applied to the controller 54 from a function setting terminal 50c which receives power slightly later than the power feed terminal 50b, as will be described specifically later. The controller 54 controls the entire apparatus 40 in accordance with such inputs.

FIG. 4 is a fragmentary view of the battery holding section 50 while FIG. 5 is an external perspective view of the battery 48. As shown, the holding section 50 has an opening 56 which allows the battery, e.g., button-like battery 48 to be partly inserted into the section 50 only in a preselected direction A. A frame 58 is positioned at the insertion side of the opening 56 and has a height corresponding to the thickness of the battery 48. The frame 58 allows the battery 48 to be inserted into the opening 56 only in its inclined position in the direction A. The power feed terminal 50a contacts the positive electrode 48a (see FIG. 5) of the battery 48 when the battery 48 is being inserted into the opening 56 in the inclined position. The power feed terminal 50b is provided on the bottom of the holding section 50 and contacts the negative electrode 48b (see FIG. 5) first. The positive electrode 48a and negative electrode 48b are respectively provided on the side and one major surface of the battery 48. The function setting terminal 50c is also provided on the bottom of the holding section 50 and contacts the negative electrode 48b of the battery 48 last, i.e., when the battery 48 has been fully inserted into the holding section 50. The reference numeral 60 designates a part of the casing of the apparatus 40.

A reference will be made to FIGS. 6A–6C for describing how the battery 48 is inserted into the holding section 50. As shown in FIG. 6A, the battery 48 is inserted into the opening 56 in its inclined position in the direction A. As a result, the negative electrode 48b of the battery 48 mechanically contacts the power feed terminal 50b, as shown in FIG. 6B. When the battery 48 is inserted deeper into the holding section 50, the side or positive electrode 48a of the battery 48 mechanically contacts the power feed terminal 50a. At this time, power is stably applied to the controller 54. The function setting terminal 50c oriented in the opposite direction to the power feed terminal 50b is prevented from contacting the negative electrode 48b by the frame 58. When the battery 48 is inserted into the holding section 50 b over the frame 58, the battery 48 is pressed downward in a direction C, as shown in FIG. 6C. After the entire battery 48 has been received in the holding section 50, the function setting terminal 50c mechanically contacts the negative electrode 48b of the battery 48. Because power has already been stably applied to the controller 54, the controller 54 is prevented from malfunctioning when the entire battery 48 is nested in the holding section 50.

To remove the battery 48 from the holding section 50, the part of the battery 48 adjoining the frame 58 is lifted in a direction D and then moved in a direction B, as shown in FIG. 6C.

In summary, in the illustrative embodiment, the electrodes 48b and 48a of the battery 48 and the second and first terminals 50b and 50a of the battery holding section 50 sequentially contact each other, thereby feeding power to the electronic circuitry built in the apparatus 40. This successfully stabilizes the electronic circuitry. After the battery 48 has been fully received in the holding section 50, the electrode 48b contacts the third terminal 50c. As a result, a voltage signal is fed from the third terminal 50c to the circuitry, so that the circuitry is free from malfunctions.

Various modifications will become possible for those skilled in the art after receiving the teachings of the present disclosure without departing from the scope thereof.

What is claimed is:

1. A structure of a battery holding section included in a portable electronic apparatus, comprising:

an opening for allowing a battery to be partly inserted into said battery holding section only in a predetermined direction;

a first connection terminal for contacting a first electrode of said battery when said battery is being inserted through said opening;

a second connection terminal for contacting a second electrode of said battery first; and a third connection terminal for contacting said second electrode last when said battery is fully received in a preselected position in said battery holding section.

2. A structure as claimed in claim 1, further comprising a frame positioned at an insertion side of said opening and having a height corresponding to a thickness of said battery, and for allowing said battery to be inserted through said opening only in an inclined position in said preselected position.

3. In a portable electronic apparatus having a battery holding section, said battery holding section comprises:

an opening for allowing a battery to be partly inserted into said battery holding section only in a preselected direction;

a first connection terminal for contacting a first electrode of said battery when said battery is being inserted through said opening;

a second connection terminal for contacting a second electrode of said battery first; and a third connection terminal for contacting said second electrode last when said battery is fully received in a preselected position in said battery holding section.

4. A structure of a battery holding section included in a portable telephone, comprising:

an opening for allowing a battery to be partly inserted into said battery holding section only in a preselected direction;

a frame positioned at an insertion side of said opening and having a height corresponding to a thickness of said battery, and for allowing said battery to be inserted through said opening only in an inclined position in said preselected direction;

a first power feed terminal for contacting a first electrode provided on a side of said battery when said battery is being inserted through said opening in the inclined position;

a second power feed terminal for contacting a second electrode provided on one major surface of said battery first; and a third power feed terminal for contacting said second electrode last when said battery is fully received in a preselected position in said battery holding section.

5. A structure as claimed in claim 4, wherein said battery comprises a button-like miniature battery.

6. In a portable telephone having a battery holding section, said battery holding section comprises:

an opening for allowing a battery to be partly inserted into said battery holding section only in a preselected direction;

a frame positioned at an insertion side of said opening and having a height corresponding to a thickness of said battery, and for allowing said battery to be inserted through said opening only in an inclined position in said preselected direction;

a first power feed terminal for contacting a first electrode provided on a side of said battery when said battery is being inserted through said opening in the inclined position;

a second power feed terminal for contacting a second electrode provided on one major surface of said battery first; and a third power feed terminal for contacting said second electrode last when said battery is fully received in a preselected position in said battery holding section.

\* \* \* \* \*